United States Patent [19]
Rebec et al.

[11] Patent Number: 5,594,936
[45] Date of Patent: Jan. 14, 1997

[54] GLOBAL DIGITAL VIDEO NEWS DISTRIBUTION SYSTEM

[75] Inventors: Mohammed S. Rebec; Mihailo V. Rebec, both of Bristol, Ind.

[73] Assignee: Trans Video Electronics, Inc., Bristol, Ind.

[21] Appl. No.: 85,329

[22] Filed: Jul. 2, 1993

Related U.S. Application Data

[63] Continuation-in-part of Ser. No. 47,089, Apr. 16, 1993.
[51] Int. Cl.$^6$ .................................................. H04N 7/20
[52] U.S. Cl. .............................. 455/3.2; 455/4.2; 348/7; 348/13
[58] Field of Search .................. 347/7–13; 455/3.1–6.3; 375/211, 212, 219, 220, 222, 257; 370/60, 61, 62, 69.1, 72, 73, 124, 85.1, 85.7, 85.9, 85.13, 85.14; 379/93, 94

[56] References Cited

U.S. PATENT DOCUMENTS

5,198,899  3/1993  Cang ........................................... 348/7

Primary Examiner—David E. Harvey
Attorney, Agent, or Firm—Fleshner & McConathy PLLC

[57] ABSTRACT

An information distribution system for a digital network, includes a master communications unit for establishing communications with the network in order to receive a synchronous digital signal, a distribution amplifier unit for receiving and dividing the synchronous digital signal into a plurality of synchronous signals and a plurality of communications units for establishing communications with a plurality of receiving stations. The system also includes a master controller for controlling the plurality of communications units from a central location. The invention alternatively relates to an information disseminating system for a digital network and includes a plurality of video clip storing units, each storing data related to a particular subject matter, a plurality of distribution amplifiers associated with the video clip storing units and a plurality of communications units which establish communications between the plurality of distribution amplifiers and the digital network. A menu storing unit accessible from the digital network, stores information indicating the subject matter associated with each of the plurality of video clip storing units as well as information as to how to access each of the video clip units.

14 Claims, 9 Drawing Sheets

FRONT VIEW

FIGURE 3B

SYNCHRONOUS DISTRIBUTION WHICH AMPLIFIES AND EQUALIZES

GLOBAL DIGITAL VIDEO NEWS DISTRIBUTION SYSTEM

BACKGROUND OF THE INVENTION

This is a continuation-in-part of U.S. patent application Ser. No. 08/047,089, filed Apr. 16,1993, incorporated herein by reference.

I. Field of the Invention

This invention relates generally to an apparatus and method for transmitting digital information to locations throughout the world and in particular to a global digital news distribution system for transmitting digital news clips and/or digitized photographs for printing simultaneously from one or more locations anywhere in the world to one or more locations anywhere in the world.

II. Description of the Related Art

Figure 1A:
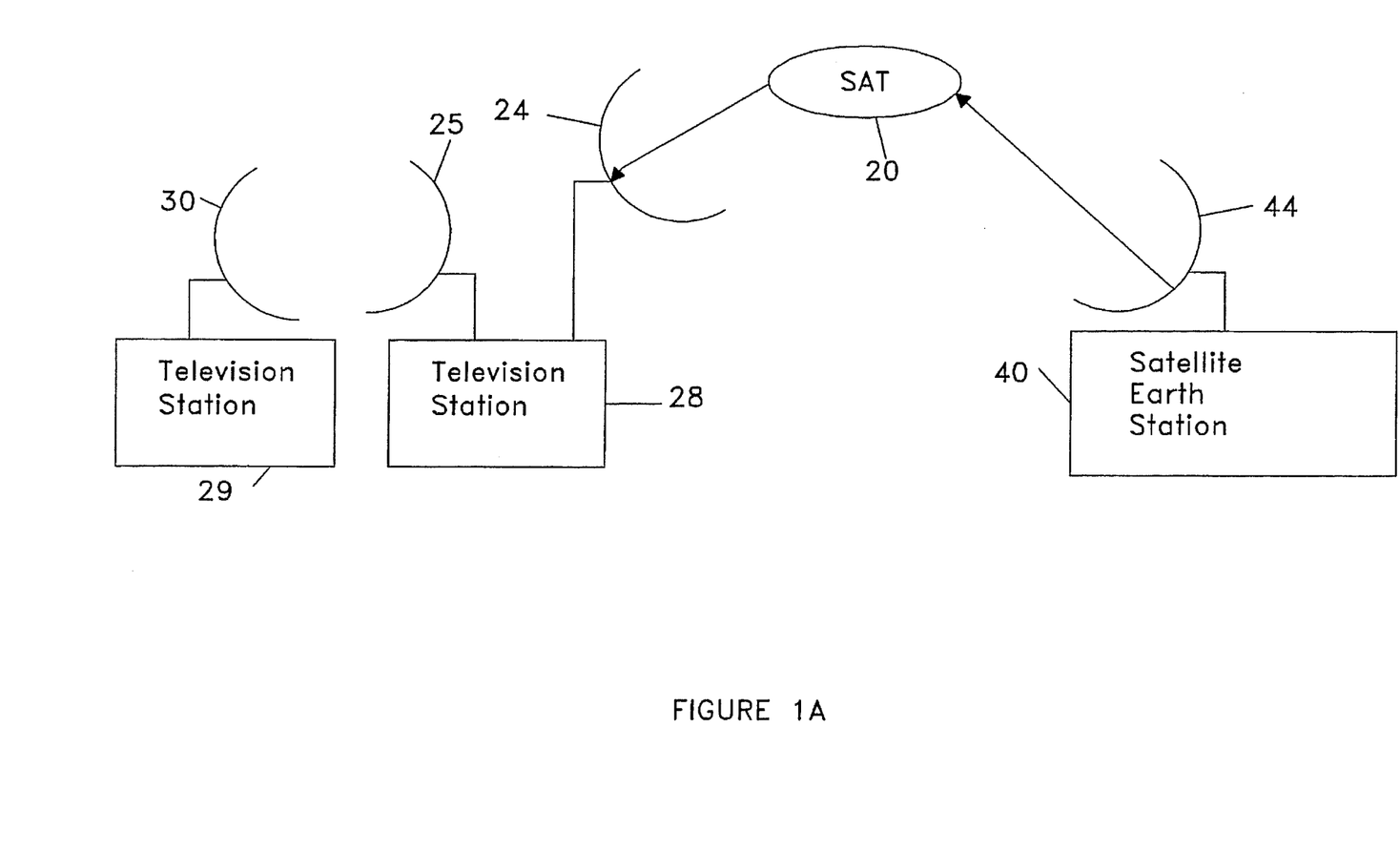
FIG. 1A shows how a television station receives a video clip from a remote location and sends that clip to another location for broadcasting.

FIG. 1A shows how a television station 28 receives a video clip from a remote location and sends that clip to another location for broadcasting. In particular, FIG. 1A shows a satellite earth station 40 with a large C or Ku disk 44 which uplinks C or Ku microwaves to satellite 20. Satellite 20 in turn downlinks these microwave signals to television station 28 where it can be broadcast live to a surrounding area or taped for broadcast at a later time. Alternatively, television station 28 can retransmit the video clip from disk 25 to another television station 29 having its own disk 30.

This process has a variety of drawbacks. First, the news information must be sent from point to point (a serial type of data transfer) rather than from point to multi-point (a parallel type of information transfer). Also, television station 28 can only receive in one direction (the direction in which it is pointed) and can only simultaneously transmit in multiple directions if it has multiple satellite dishes. This process has the further limitation of transmitting and storing video clips in analog form and consequently is not readily compatible with digital land networks such as ACUNET. Also, the current process does not provide on-demand news, but instead news clips must be transmitted on a prearranged basis from satellite earth station 40 to television station 28 and from television station 28 to television station 29.

In addition to the above limitations, the current process does not have a news distribution system which has both digital recording ability. Hence, a television station 29 cannot get its news clips from a hub station and immediately digitally edit those clips. The current process does not provide a digital data base which organizes information so that local television stations can log into a menu which provides a list of particular news clips which are available. The current process does not provide a flexible system which enables a hub station to transmit its video clips at various rates to accommodate various rates of data transfer at various receiving sites. In addition, the process is expensive and local stations cannot selectively choose which news clips they wish to receive.

SUMMARY OF THE INVENTION

It is therefore an object of the invention to provide an information distribution system which can disseminate information from one point to a plurality of receivers in a parallel fashion.

Another object of the invention is to provide a method and apparatus which can simultaneously transmit audio/video information in diametrically opposite directions.

Another object of the invention is to provide a method and apparatus which is readily compatible with digital networks such as ACUNET.

Another object of the invention is to provide on-demand access to audio/video news clips.

One advantage of the invention is that it eliminates the need to prearrange times to transmit from one satellite earth station to a television station or from one television station to another television station.

Another advantage of the invention is that it provides a news distribution system which has both digital recording and scan conversion capabilities so that a local television station can get its news clips from a hub station and selectively edit those clips.

Another advantage of the invention is that it transmits news clips inexpensively.

Another advantage of the invention is that it provides news information organized so that local television stations can log into a menu which provides a list of available news clips and how to acquire those clips.

One feature of the invention is that it provides a hub station which can transmit its video clips at various rates to accommodate various rates of data transfer at various receiving locations.

Another feature of the invention is that local stations can selectively choose which news clips they wish to receive.

Another feature of the invention is that it makes it possible to selectively edit news clips at the local station, if desired.

These and other objects advantages and features are accomplished according to the invention by the provision of an information distribution system for a digital network, which includes: a master communications unit coupled to the digital network for establishing communications with the network in order to receive a synchronous digital signal from the network. The system further includes a distribution amplifier unit coupled to the master communications unit for receiving and dividing the synchronous digital signal into a plurality of synchronous signals. The system also provides for a plurality of communications units coupled to the distribution amplifier unit for establishing communications with a plurality of receiving stations and for receiving and outputting a respective one of the plurality of synchronous signals to the plurality of receiving stations. The system further includes a master controller unit coupled to the plurality of communications units for controlling the plurality of communications units from a central location.

The above objects, advantages and features are even further accomplished by the provision of an input unit in the master controller unit for inputting instructions to control the plurality of communications units.

The above and other objects, advantages and features are further accomplished by the provision of a first back-up memory for receiving and storing at least one asynchronous signal.

The above and other objects, advantages and features are further accomplished by the provision of an equalizing unit for equalizing respective amplitudes of the plurality of synchronous signals.

These and other objects, advantages and features are accomplished by the provision of an information disseminating system for a digital network, including: a plurality of video clip storing units for storing data, each of the plurality of video clip storing units storing data related to a particular subject matter; a plurality of distribution amplifier units each having an input for receiving data from a respective one of the plurality of video clip storing units and each having at least one output, for dividing the data stored in each of the plurality of video clip storing units. The system further includes a plurality of communications units at least one of which is coupled to a respective one of the plurality of distribution amplifiers, wherein the plurality of communications units establish communications between the plurality of distribution amplifier units and the digital network. The system further includes a menu storing unit accessible from the digital network, for storing information indicating the subject matter associated with each of the plurality of video clip storing units as well as information as to how to access each of the video clip storing units.

These and other objects advantages and features are further accomplished by the provision of a method for distributing information to various locations in a digital network, including the steps of: establishing communications with the network in order to receive a synchronous digital signal from the network; receiving and dividing the synchronous digital signal into a plurality of synchronous signals; establishing communications with a plurality of receiving stations; receiving and outputting a respective one of the plurality of synchronous signals to a respective receiving station; and controlling the receiving and outputting step with a controller unit at a central location.

Further features and advantages will become apparent from the following description of the preferred embodiments taken with the drawings.

DETAILED DESCRIPTION OF PREFERRED EMBODIMENTS

Figure 1B:
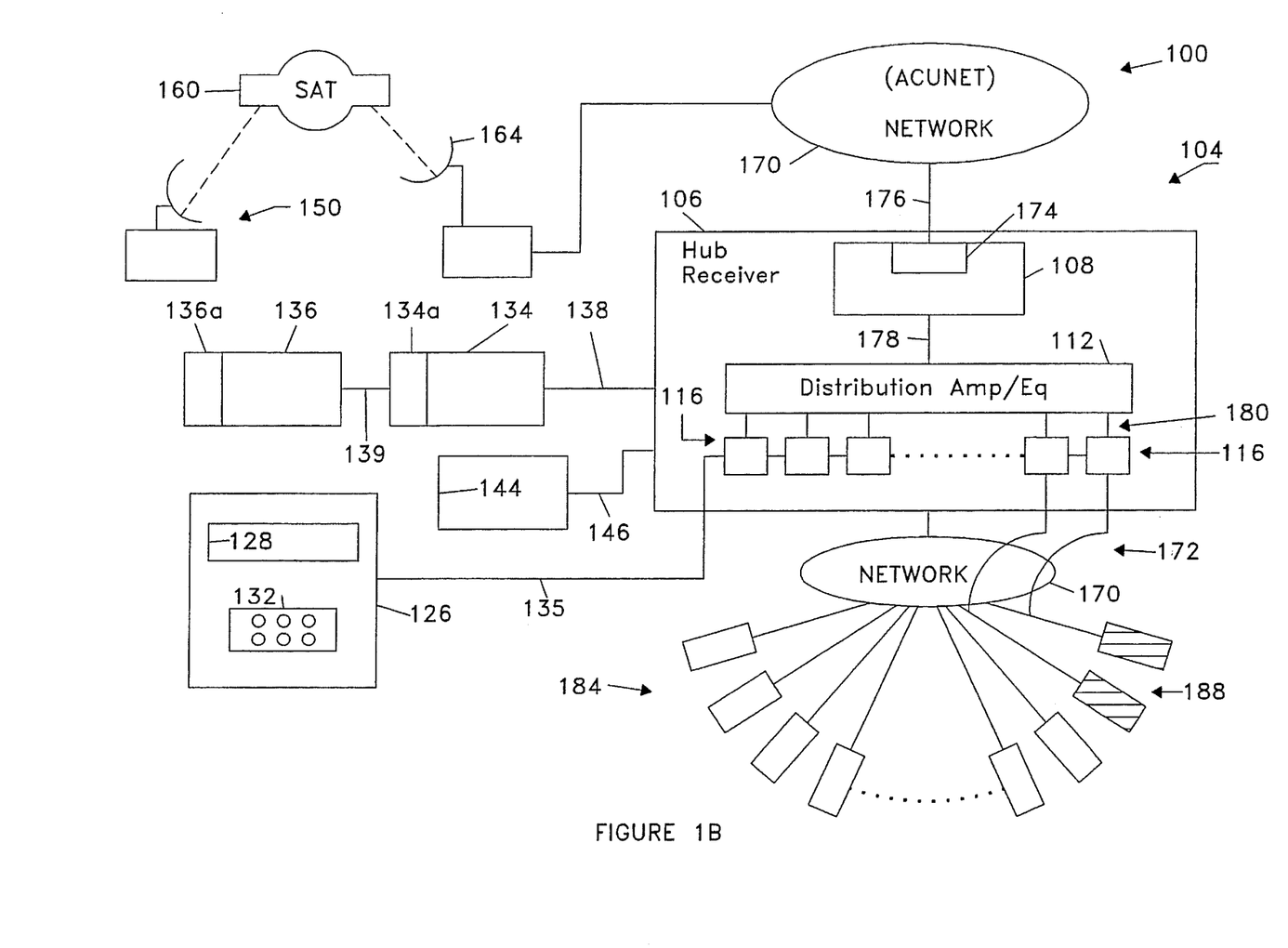
FIG. 1B shows a digital information distribution system according to one embodiment of the invention.

FIG. 1B shows a digital network 100 having a digital information distribution system 104 according to one embodiment of the invention. Digital information distribution system 104 includes a hub receiver 106 having a master CSU/DSU 108, a distribution amplifier/equalizer 112 and a plurality of CSU/DSUs 116. CSU/DSUs are communications units which perform hand-shaking functions to initiate communications between synchronous digital equipment. One example of a CSU/DSU unit is CSU/DSU model 1056S from Integrated Network Corporation (I.N.C.). Digital information distribution system 104 further includes a master controller 126 having a master controller display 128 and a master controller keypad 132. Master controller 126 is connected to the plurality of CSU/DSUs 116 via one or more RS-232 lines 135. Digital information distribution system 104 also includes a first backup unit 134 having a first backup hard disk 134a and a second backup unit 136 having a second backup hard disk 136a. Backup unit 134 is connected to hub receiver 106 via RS-232 line 138. Second backup unit 136 is connected to first backup unit 134 via RS-232 line 139. Digital information distribution system 104 also has a recorder 144 connected to hub receiver 106 via RS-232 line 146.

Digital information distribution system 104 operates as follows. A suitcase transmission unit 150, such as the suitcase unit described in U.S. patent application Ser. No. 08/047,089, gathers a video clip, compresses that clip and then transmits or uplinks that clip to a satellite system 160 which may include one or more satellites and one or more earth stations. Satellite system 160 eventually downlinks the compressed video news clip to an earth station 164 which is coupled to a land network 170 such as ACUNET. Land network 170 can include microwave links, hard wire links and optical fiber links. Land network 170 is a synchronous digital system and consequently is coupled to hub receiver 106, and in particular, to master CSU/DSU 108 via a V.35 pin input 174 which receives line 176. Synchronous (V.35) line 178 interconnects master CSU/DSU 108 to distribution amplifier/equalizer 112.

Digital network 100 transmits digital information corresponding to a news clip from a camera (not shown) which can serve as a news clip for television and other audio/video media. Alternatively, the digital information can serve as a series of still photographs for printed media.

Figure 1C:
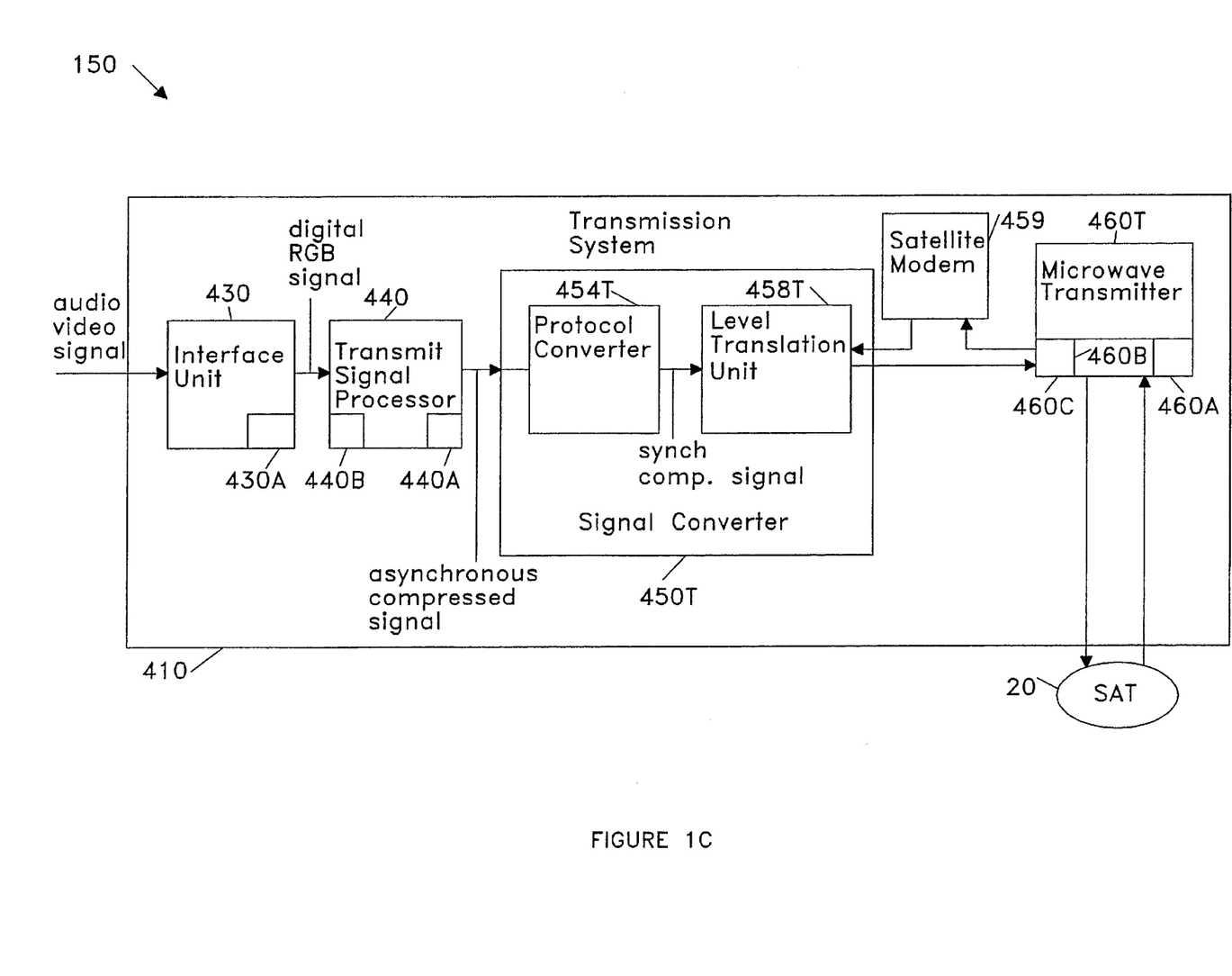
FIG. 1C shows a transmission system which can be used to transmit video clips from remote locations and FIG. 1D shows backup units which include a signal converter and a receive signal processor.

FIG. 1C shows a transmission system 410 which can be used to transmit video clips from remote locations. Transmission system 410 includes an interface unit 430 which receives an analog audio/video signal from a camera (not shown) and transforms that analog audio/video signal into a digital red, green, blue (RGB) signal. Interface unit 430 demodulates the audio/video signal which can be a NTSC, PAL, or SECAM signal and outputs the digital RGB signal. The digital RGB signal is received by a transmit signal processor 440 which compresses the digital RGB signal into an asynchronous compressed signal and stores that asynchronous compressed signal on a hard disk 440A. Transmit signal processor 440 can then output the asynchronous compressed signal which, in turn, is received by a signal converter 450T.

Signal converter 450T includes a protocol converter, 454T and a level translation unit 458T. Protocol converter 454T receives the asynchronous compressed signal and converts that signal to a synchronous compressed signal. The synchronous compressed signal is then input to level translation unit 458T which translates it into a level translated synchronous compressed signal ready to be received by a microwave transmitter (not shown) which is part of digital network 100.

Returning to FIG. 1B, hub receiver 104 distributes digital information such as a compressed video news clip or a series of still pictures as follows. The compressed video news clip is input to master CSU/DSU 108 via line 176 which receives a synchronous digital data stream and performs hand-shaking functions. These handshaking functions initiate communications between network 170 and distribution amplifier/equalizer 112. Master CSU/DSU 108 then outputs the synchronous digital signal which is received by distribution amplifier/equalizer 112. Distribution amplifier/equalizer 112 then splits up the resulting synchronous signal and outputs a plurality of synchronous signals to each of the plurality of CSU/DSUs 116 via output lines 180. Each of the plurality of CSU/DSUs 116 is coupled into land network 170 via lines 172 which in turn are coupled to receiving stations 184. Alternatively, if no digital network (e.g., ACUNET) is available, remote suitcases 188 can be used as receiving stations as described in U.S. patent application Ser. No. 08/047,089.

Figure 1D:
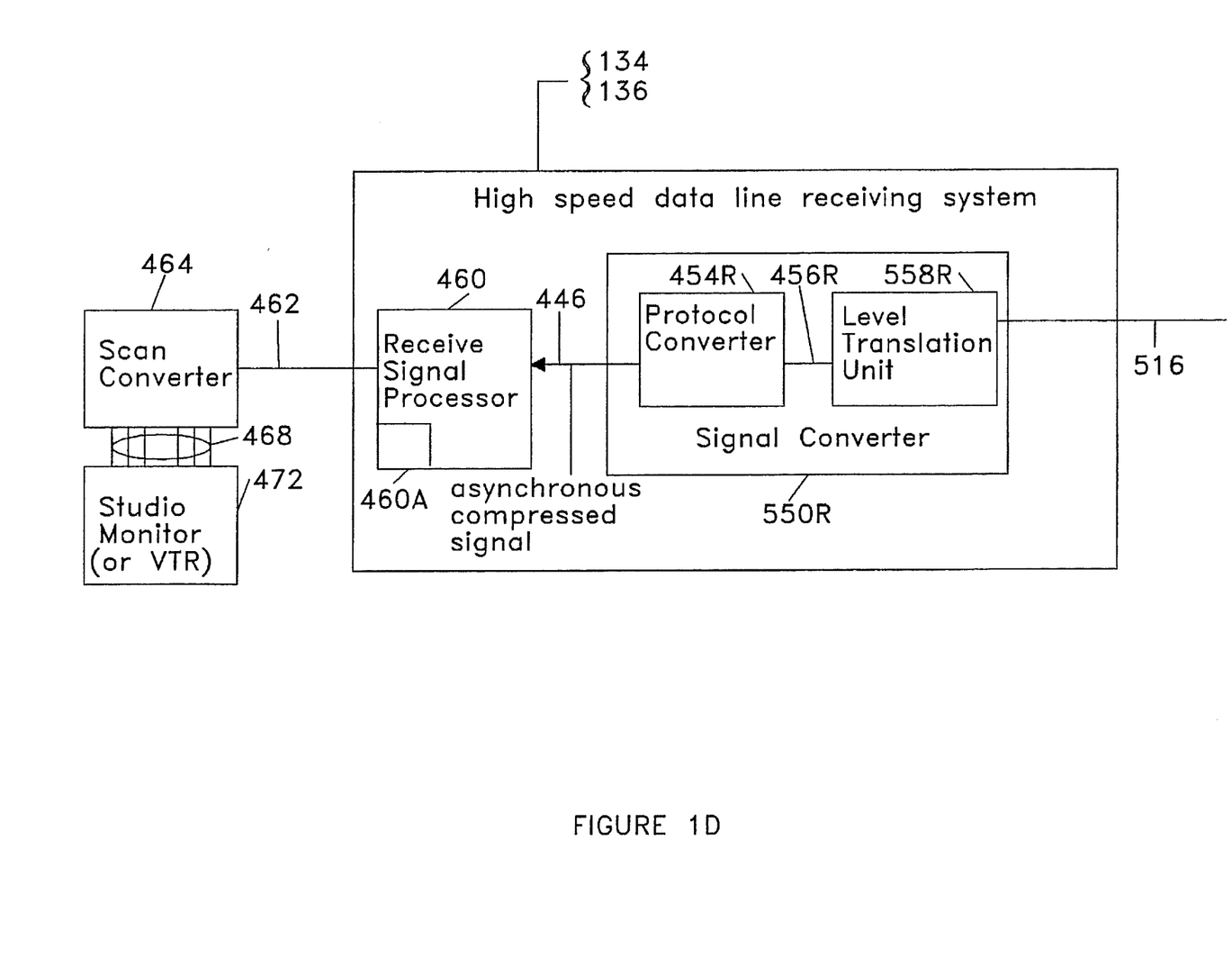

First and second backup units 134 and 136 function as a digital receiving system similar to digital receiving system 510 in U.S. patent application Ser. No. 047,089. In particular, referring to FIG. 1D, backup units 134 and 136 include a signal converter 550R followed by a receive signal processor 460. Signal converter 550R includes level translation unit 558R followed by protocol converter 454R. A high speed digital (HSD) signal is received on line 516 by signal converter 550R. Level translation unit 558R in turn translates the voltage level of that high speed digital signal for transmission on serial line 456R as a synchronous compressed signal. Protocol converter 454R then receives and transforms this synchronous compressed signal into an asynchronous, compressed signal for transmission on a bus 446 to receive signal processor 460. Receive signal processor 460 decompresses this asynchronous, compressed signal and stores a resulting asynchronous, compressed signal on a hard disk 460A. If the decompression of the asynchronous compressed signal received by signal processor 480 is the inverse of the compression which the digital clip underwent at transmission unit 150, receive signal processor 460 outputs a digital signal corresponding to the news clip output from the camera at unit 150.

Figure 2:
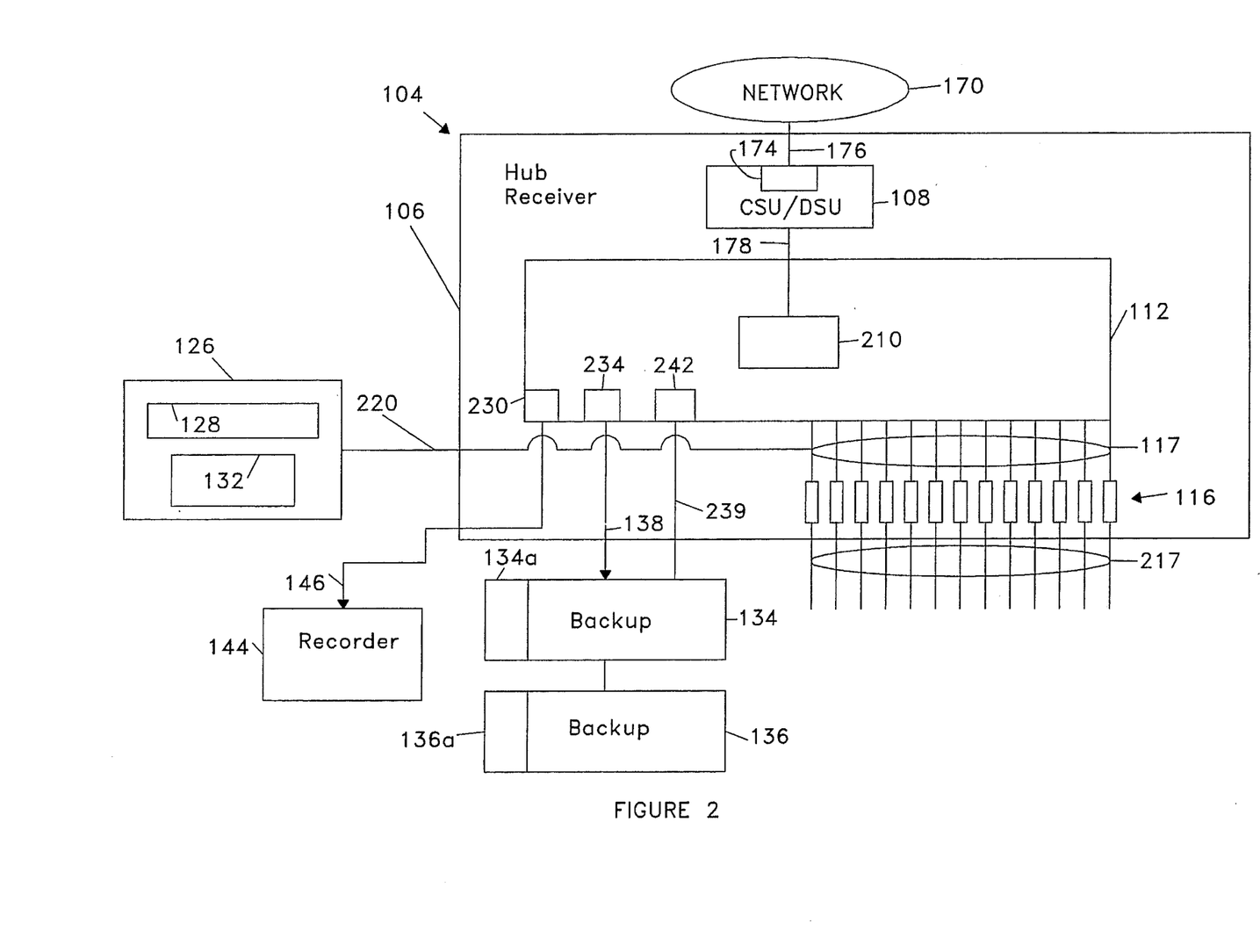
FIG. 2 shows the digital information distribution system in more detail.

FIG. 2 shows digital information distribution system 104 in somewhat more detail. Again, land network 170 is coupled to master CSU/DSU 108 via line 176. V.35 input 174 is coupled to master CSU/DSU 108 via synchronous line 178. V.35 input 174 is in turn coupled to a synchronous-to-asynchronous converter 210 (such as converter 450T in FIG. 1C and in U.S. patent application Ser. No. 08/047,089) in distribution amplifier/equalizer 112. Distribution amplifier/equalizer 112 further includes outputs 230 and 234 connected to recorder 144 and backup unit 134 via RS-232 lines 146 and 138, respectively. Distribution amplifier/equalizer 112 also has an input 242 for receiving the backup signal from backup unit 134 or backup unit 136. The plurality of CSU/DSUs 116 have respective output cables 217 which are coupled to receiving stations 184 of FIG. 1B.

Master controller 126 is coupled to the plurality of CSU/DSUs 116 via RS-232 line 220. RS-232 line 220 can be a bundle of individual RS-232 lines, wherein each line is connected to a different CSU/DSU, or each of the plurality of CSU/DSUs 116 can have a unique address, in which case line 220 can be a single RS-232 line. Distribution amplifier/equalizer 112 also has an input 242 for receiving a backup signal via RS-232 line 239 from backup unit 134 or backup unit 136. This backup signal is received by backup unit 134 or backup unit 136 at the same time it is transmitted out of distribution amplifier/equalizer 112 to CSU/DSUs 116.

Master controller 126 sends commands to the plurality of CSU/DSUs on RS-232 line 220. These commands can be entered using master controller keypad 132. The plurality of CSU/DSUs 116 can send commands to master controller 126 indicating which, if any, CSU/DSU in the plurality of CSU/DSUs 116, did not receive the news clip, or received a news clip with more than a predetermined number of errors.

Figure 3A:
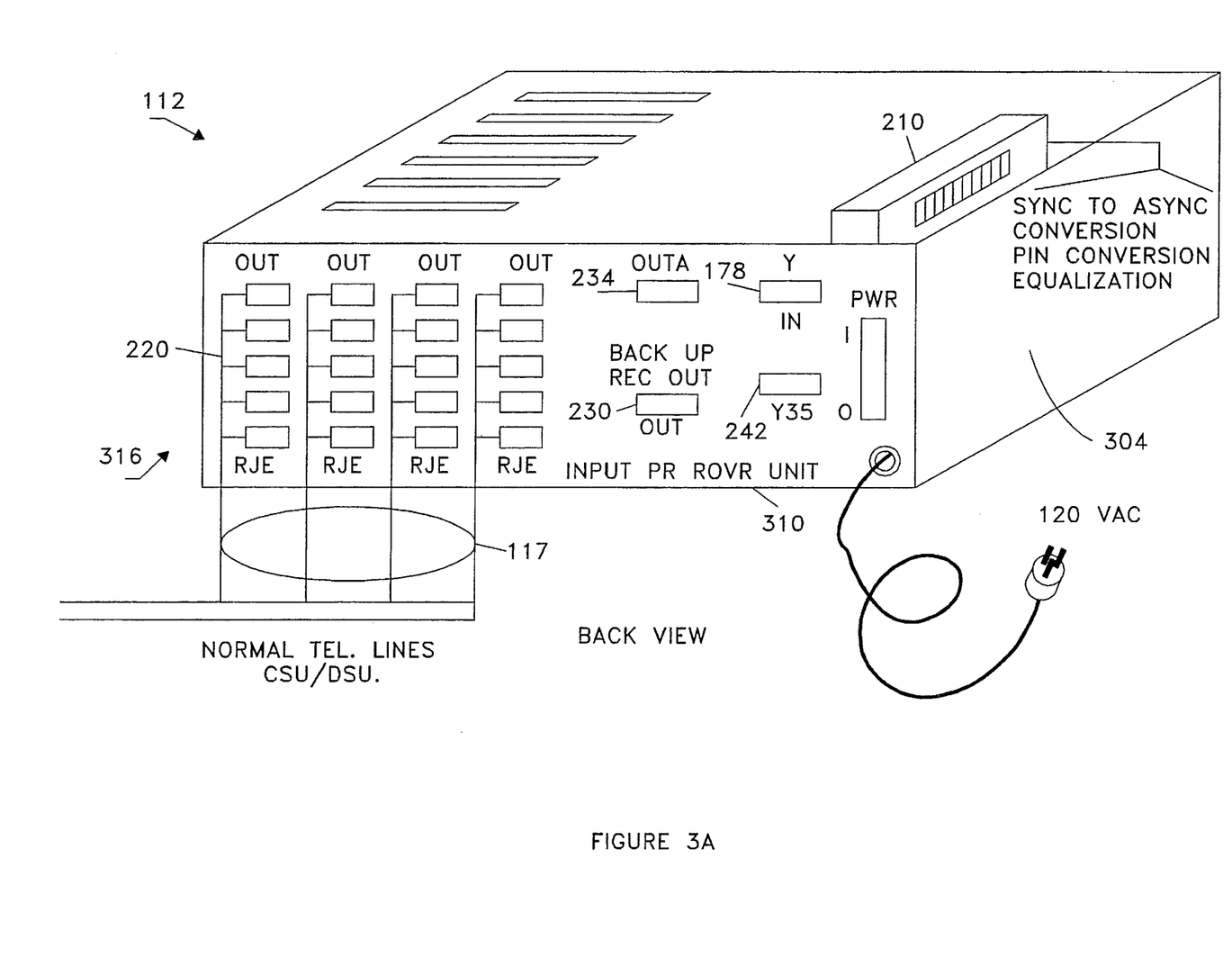
FIGS. 3A and 3B show a rear and a front view, respectively, of a distribution amplifier/equalizer in the digital information distribution system.
Figure 3B:
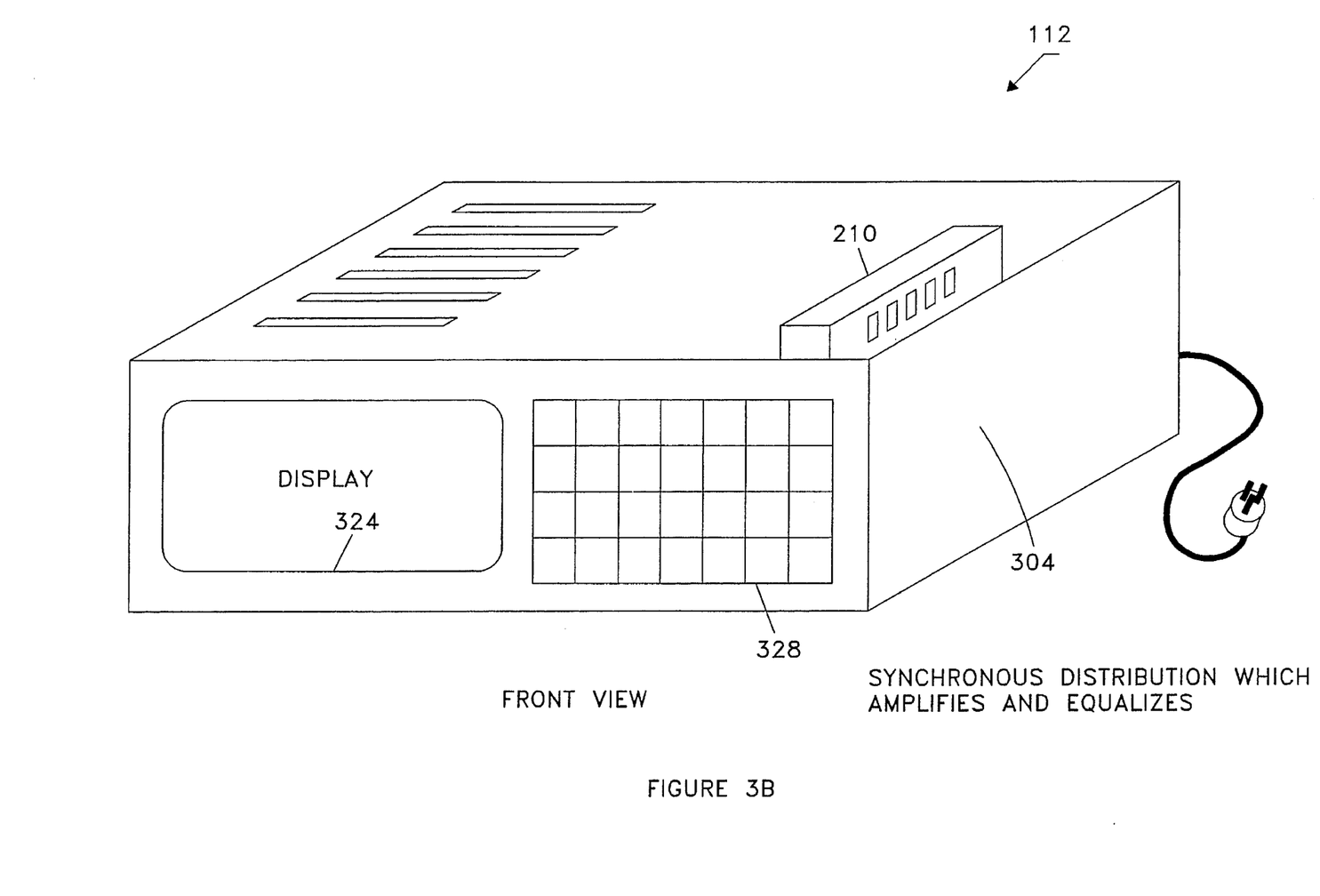

FIGS. 3A and 3B show a rear and a front view, respectively, of distribution amplifier/equalizer 112. Distribution amplifier/equalizer 112 has a housing 304 with a rear panel 310 and a plurality of outputs 316 coupled to the plurality of CSU/DSUs 116 via lines 117. FIG. 3B shows that distribution amplifier/equalizer 112 has a display 324 and a keypad 328 for manually controlling which particular lines 117 and consequently which particular CSU/DSU of the plurality of CSU/DSUs 116 are activated.

Figure 4:
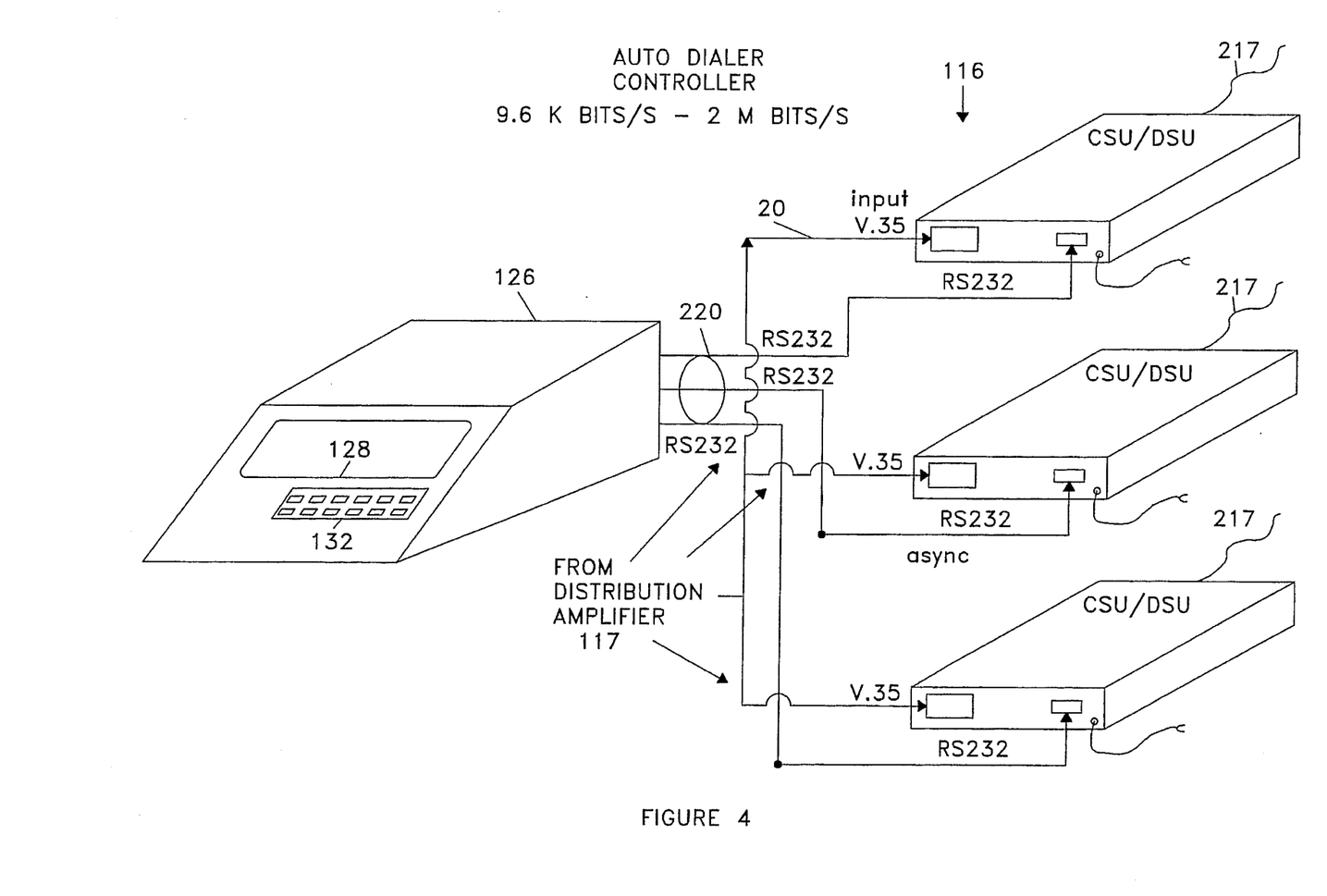
FIG. 4 shows a master controller connected to a plurality of CSU/DSUs in the distribution system.

FIG. 4 shows master controller 126 connected to the plurality of CSU/DSUs 116 via RS-232 lines 220. Here, a separate RS-232 line is connected to a respective CSU/DSU. However, as discussed above, a single RS-232 line can be connected to the plurality of CSU/DSUs 116, if CSU/DSUs 116 are separately addressable. Again, an operator sends commands to the CSU/DSU 116 by entering commands into master controller 126 using keypad 132 and then master controller 126 in turn sends these commands along the appropriate RS-232 line 220. Also, a particular CSU/DSU 116 can send information back to master controller 126 along the appropriate RS-232 line 220. The plurality of CSU/DSUs 116 can have transmission rates varying from 9.6 kilobytes/s (corresponding to normal telephone line rates) up to 2 Megabytes/s (corresponding to special high speed data line rates). It should be understood, however, that hub receiver 106 can couple to very low rate telephone lines such as telephone lines having rates of 2.4 kilobytes/s presently found in some undeveloped countries. Also, the plurality of CSU/DSUs 116 can be connected in parallel. Consequently, multiples of such 9.6 kilobyte can be multiplexed to yield a "virtual" 54 kilobyte line or a virtual 64 kilobyte line.

Figure 5:
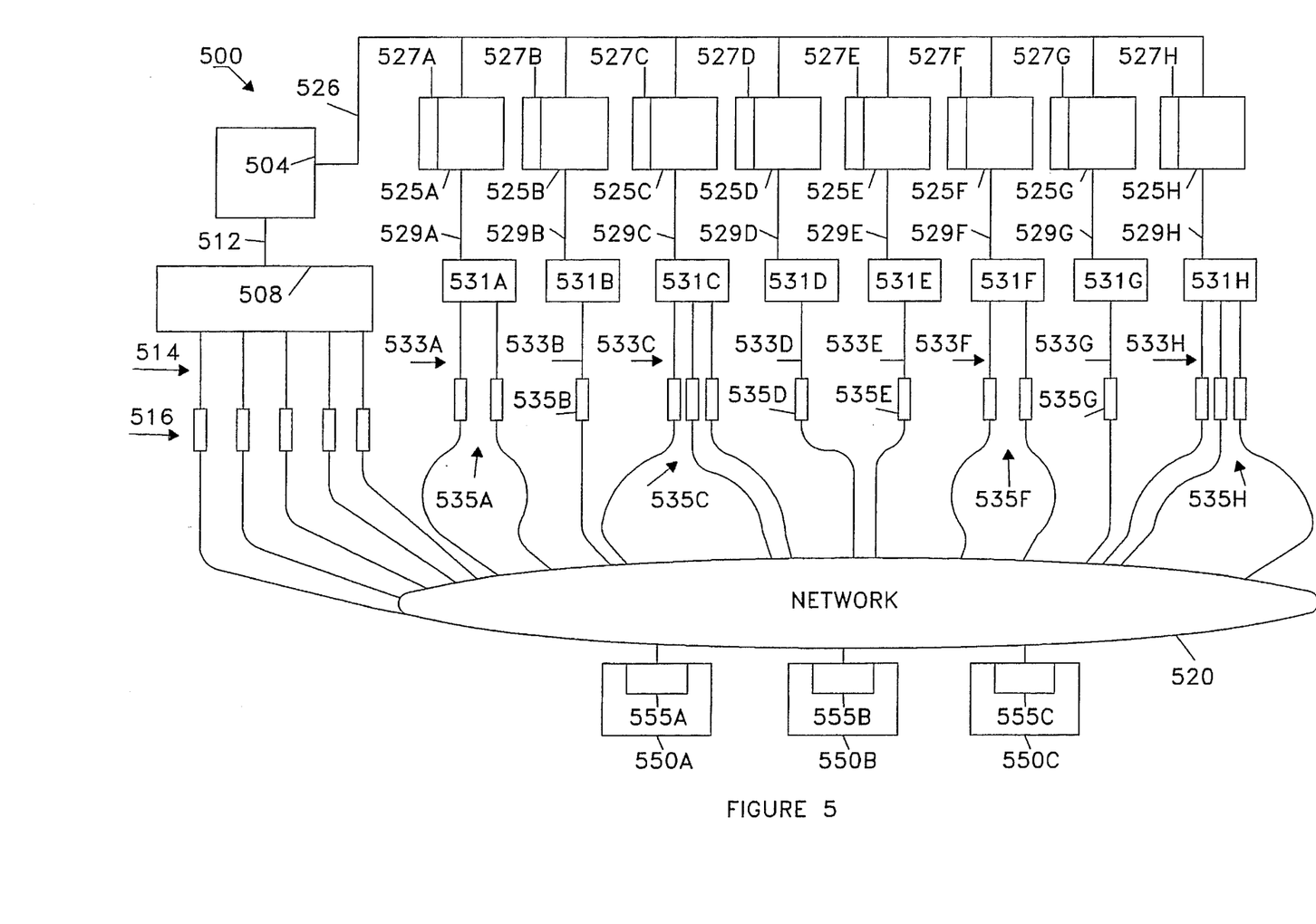
FIG. 5 shows an on-demand video news distribution system according to another embodiment of the invention.

FIG. 5 shows an on-demand video news distribution system 500 according to another embodiment of the invention. System 500 includes a video menu unit 504 coupled to a telephone line unit 508 (corresponding to distribution amplifier/equalizer 112 in FIG. 1B and 2) via line 512. Telephone line unit 508 has a plurality of output lines 514 which in turn are coupled to a plurality of menu CSU/DSU units 516. This plurality of menu CSU/DSU units are in turn coupled to network 520 (corresponding to land unit 170 of FIG. 1B) via menu lines 524.

Video news distribution system 500 includes a plurality of units 525A–525H similar to backup units 134 or 136 of FIG. 1B interconnected via bus 526. Each unit 525A–525H corresponds to a different news topic or subject matter. For example, unit 525A could correspond to current affairs in Japan, unit 525B could correspond to events in Germany, unit 525C could involve information regarding international financing, and unit 525D could be sports information. Each of the plurality of units 525A–525H includes a respective memory 527A–527H such as a hard disk in which digital information can be stored. The plurality of video clip storing units 525A–525H are coupled to distribution amplifier/equalizers 531A–531H via synchronous lines 529A–529H, respectively. Distribution amplifier/equalizers 531A–531H are identical to distribution amplifier/equalizer 112 previously discussed. Each of distribution amplifier/equalizers 531A–531H like distribution amplifier/equalizer 112 of FIG. 1B and FIG. 2 has multi-line outputs 533A–33H which are respectively coupled to CSU/DSU units 535A–535H. For example, distribution amplifier 531A has three multi-line outputs 533A coupled to CSU/DSU units 535A. Similarly, CSU/DSU units 535A–535H correspond to the plurality of CSU/DSUs 116 of FIG. 1B. CSU/DSU units 535A–535H are all coupled to network 520 in the manner discussed above with reference to FIG. 1B.

Video news distribution system 500 operates as follows. Users at television stations or at newspaper or magazine printing houses 550A–550C dial the telephone number of video menu unit 504 using computers 555A–555C (such as a personal computer with a modem), respectively, which establish communications with menu unit 504. A connected user can then view a menu listing the various clips and/or still photographs available on units 525A–525H. If the user wishes to obtain a particular clip, he or she simply enters a command to menu unit 504 which in turn sends a "request-to-send" command to the appropriate video storing unit 525A–525H. The video storing unit with that video clip or photograph then sends the video clip (photograph) via its corresponding distribution amplifier/equalizers 531A–531H via one of the corresponding CSU/DSU units 535A–535H. For example, if a user of computer 555A wants to receive a news clip on Japan which is stored in unit 525A, the user sends a command to menu unit 504 via one of the menu CSU/DSUs 516 and menu amplifier/equalizer 508. Menu unit 504 then sends a command to unit 527A via bus 526, to send that particular clip to computer 555A via amplifier/equalizer 531A. If a second user at station 550B is currently acquiring that or a different clip from unit 525A and consequently is using one of the CSU/DSUs 535A, unit 525A uses the CSU/DSU 535A which is not being used.

Numerous additional modifications and variations of the present invention are possible in light of the above teachings. It is therefore to be understood that within the scope of the appended claims, the invention may be practiced otherwise as specifically claimed.

What is claimed is:

1. An information distribution system for a digital network, comprising:

master communications means coupled to the digital network for establishing communications with the network in order to receive a synchronous digital signal;

distribution amplifier means coupled to said master communications means for receiving and dividing said synchronous digital signal into a plurality of synchronous signals;

plurality of communications means coupled to said distribution amplifier means for establishing communications with a plurality of receiving stations and for receiving and outputting said plurality of synchronous signals to the plurality of receiving stations; and master controller means coupled to said plurality of communications means for controlling said plurality of communications means from a central location.

2. The information distribution system, as claimed in claim 1, wherein said distribution amplifier means further includes converting means for converting at least one of said plurality of synchronous signals into at least one asynchronous signal.

3. The information distribution system, as claimed in claim 1, wherein said master controller means further includes input means for inputting instructions to control said plurality of communications means.

4. The information distribution system as claimed in claim 2, further comprising a first back-up memory for receiving and storing said at least one asynchronous signal.

5. The information distribution system as claimed in claim 2, further comprising a recorder for receiving and storing said at least one asynchronous signal.

6. The information distribution system as claimed in claim 1, wherein said master controller means comprises display means for displaying information associated with said plurality of communications means.

7. The information distribution system as claimed in claim 3, wherein said input means comprises a keyboard.

8. The information distribution system as claimed in claim 1, wherein said distribution amplifier means comprises equalizing means for equalizing respective amplitudes of said plurality of synchronous signals.

9. A method for distributing information to various locations in a digital network, comprising the steps of:

establishing communications with the network in order to receive a synchronous digital signal from the network;

receiving and dividing the synchronous digital signal into a plurality of synchronous signals;

establishing communications with a plurality of receiving stations;

receiving and outputting a respective one of the plurality of synchronous signals to a respective receiving station; and controlling said receiving and outputting step with a controller unit at a central location.

10. The method for distributing information as claimed in claim 9, further including the step of converting at least one of said plurality of synchronous signals into at least one asynchronous signal.

11. The method for distributing information as claimed in claim 9, further comprising the step of converting at least one of said plurality of synchronous signals into at least one asynchronous signal.

12. The method for distributing information as claimed in claim 11, further comprising the step of storing the at least one asynchronous signal in a memory.

13. The method for distributing information as claimed in claim 11, further comprising the step of recording the at least one asynchronous signal with a back-up recorder.

14. The method for distributing information as claimed in claim 11, further comprising the step of equalizing respective amplitudes of the plurality of synchronous signals.

\* \* \* \* \*